ent [19] [11] 3,883,459
Kent [45] May 13, 1975

[54] THERMOELASTIC ARTICLES AND PROCESS OF MANUFACTURE THEREOF

[75] Inventor: Eric George Kent, Sarnia, Ontario, Canada

[73] Assignee: Polysar Limited, Sarnia, Ontario, Canada

[22] Filed: Mar. 7, 1974

[21] Appl. No.: 449,036

[30] Foreign Application Priority Data
Apr. 18, 1973 Canada............................. 169107

[52] U.S. Cl. 260/28.5 B; 260/28.5 A; 260/28.5 AV; 260/80.7; 260/94.3; 260/94.7 A; 264/230
[51] Int. Cl. ............................................ C08c 11/70
[58] Field of Search .. 260/28.5 A, 28.5 AV, 28.5 B, 260/80.7, 94.3, 94.7 A

[56] References Cited
UNITED STATES PATENTS

| | | | |
|---|---|---|---|
| 2,436,885 | 3/1948 | Gauld et al................. | 260/28.5 B |
| 2,919,256 | 12/1959 | Wallgren.................... | 260/28.5 B |
| 3,205,205 | 9/1965 | Adams....................... | 260/80.7 |
| 3,222,333 | 12/1965 | Dick........................... | 260/79.5 B |
| 3,347,839 | 10/1967 | Lasis.......................... | 260/94.3 |
| 3,550,158 | 12/1970 | Natta et al.................. | 260/94.3 |
| 3,642,758 | 2/1972 | Cozewith.................... | 260/94.3 |

*Primary Examiner*—Melvyn I. Marquis
*Attorney, Agent, or Firm*—Stevens, Davis, Miller & Mosher

[57] ABSTRACT

A process is described and the product thereof, for the manufacture of a thermoelastic product wherein a blend of a vulcanizable crystalline elastomer, a crystalline wax and a vulcanizing agent are vulcanized. The thermoelastic product has the property of being able to store elastic stresses imposed on it and of being able to release these stresses when warmed slightly.

9 Claims, No Drawings

THERMOELASTIC ARTICLES AND PROCESS OF MANUFACTURE THEREOF

This invention relates to vulcanized blends of crystalline polymer and crystalline wax and to the production of thermoelastic articles.

The term "thermoelastic" as used in this specification refers to a vulcanized composition or article which may be extended, at room temperature or at slightly elevated temperatures, to at least double its original length and will retain this extended shape at room temperature until warmed again to a slightly elevated temperature when the stresses are relieved and the shaped article returns to essentially its original dimensions.

Blends of rubber and wax are not new. For example, it was known to add a small amount of pale crepe or balata to modify the properties of wax in applications such as moisture proofing films or tapes. It is also known to add small amounts of wax to rubber compounds to improve their resistance to ozone. However, wax has not been blended with crystalline polymers for the purpose of producing thermoelastic compositions and articles.

In accordance with this invention a process is provided for producing a thermoelastic composition capable of storing elastic stresses which process is preparing a mixture comprising (a) 100 parts by weight of a vulcanizable crystalline elastomer having a crystalline melting point from about 50° to about 150°C, (b) from 5 to 100 parts by weight of a crystalline wax, and (c) vulcanizing agent, and vulcanizing the mixture to produce a vulcanized thermoelastic composition.

The thermoelastic composition made in accordance with the above process is suitable for preparing thermoelastic articles which are capable of storing elastic stresses and strains imposed thereon and, when heated to a slightly elevated temperature, of releasing the stored stresses and returning to the original shape. The articles may be in the form of molded or shaped goods such as toys and mechanical rubber goods that after extended use or abuse may be restored to the original shape by simply warming them to a slightly elevated temperature.

The articles may also be in the form of extruded profiles, tubes, tapes and films which may be repeatedly stretched and heat shrinked.

The crystalline elastomers which can be used in this invention are high molecular weight vulcanizable elastomers having at least 5 percent but preferably at least 10 percent crystallinity and up to about 40 percent crystallinity, as detected by an X-ray diffraction method. The melting point of such polymeric crystals should be between about 50°C and 150°C, preferably between 65° and 90°C. Representative examples of such elastomers are ethylene-propylene copolymers or terpolymers with a variety of multiolefins containing above about 80 percent ethylene, polymers and copolymers of conjugated diolefins such as trans-1,4 polybutadiene, trans-1,4 polyisoprene, trans-1,4 polychloroprene, trans-1,4 copolymers of butadiene with less than 20 percent by weight of comonomers such as ethylene and piperylene and crystalline copolymers of ethylene with vinyl acetate, ethyl acrylate, vinyl chloride, etc. The preferred crystalline polymers are trans-1,4 polymers of conjugated diolefins such as isoprene, butadiene-1,3 or chloroprene, of which the most preferred is trans-1,4 polyisoprene, having a trans-1,4 content of at least 85 percent, a crystallinity as determined by X-ray diffraction of about 15 to 40 percent and a Mooney viscosity (M/L 4 100°C) of about 5 to 50. The crystalline melting point of such a trans-1,4 polyisoprene is about 70° to about 80°C.

The crystalline wax which can be used in this invention may be selected from natural waxes of vegetable or animal origin, petroleum waxes and synthetic waxes having a melting point of at least above 40°C, preferably between about 50°C and about 100°C and most preferably between about 50°C and about 65°C. The representative natural waxes are beeswax, chinese wax, shellac spermacetti wax, Candellila, Carnauba, palm wax, sugar cane wax, Japan wax, Ouricuri wax, ceresin, montan wax or ozocerite. Synthetic waxes include solid esters of polyhydric alcohols, e.g., stearates of glycerine, hydrogenated castor oil, high molecular weight ($C_{18-30}$) acids or alcohols, and paraffin waxes such as produced in the Fischer-Tropsch process. When it is desirable to have a composition for manual handling and which becomes rubbery at moderate temperatures of up to about 60°C, the low melting waxes are preferably used. In applications such as tapes, tubing, films and sheets which are normally exposed to higher operating temperatures, the higher melting waxes are preferable. The amount of wax may vary between 5 and 100 parts but it is preferred to use from about 10 parts to about 60 parts, said parts being parts by weight per 100 parts of elastomer. For specific applications, it may be desirable to mix a high melting wax with a low melting wax or a natural wax with a synthetic wax or a paraffinic wax with an ester of a polyhydric alcohol so as to adjust the melting point of the mixture or to make the wax more or less compatible with the polymer. Complete compatibility is not desired as it would affect the crystallization of the wax-polymer composition.

The composition containing wax and polymer of this invention is mixed, shaped as desired and then vulcanized to produce a thermoelastic composition. The vulcanization may be achieved by irradiation in the absence of any additives but preferably the polymer-wax mixture is mixed with vulcanizing agents and cured at either ambient or elevated temperatures depending on the activity of the vulcanizing agents. The vulcanizing agents are conventional materials: for example, the free radical vulcanization systems including sulphur or sulphur-bearing compounds may be used for unsaturated polymers and organic peroxides for either saturated or unsaturated polymers, whereas polyamines or salts of multivalent metals are used for chlorine-containing polymers.

The compositions of this invention are cured to a low level of cross-link density, sufficient to allow re-crystallization of the vulcanizate to occur at a reasonably rapid rate in order that the warm distorted vulcanizate will freeze into its new shape rapidly on cooling. Satisfactory vulcanization may be achieved with normal levels of curative or with as little as one-third of the normally used quantities of curatives, the reduced level of curative being of advantage to retain a substantial amount of polymer crystallinity.

In addition to the above-mentioned components, the composition of this application may contain fillers, other polymers, antioxidants and dye-stuffs. The last two additives are added in small amounts of usually not more than about 5 parts per 100 parts of elastomer. The fillers are added in amounts of up to 100 parts and improve the strength of the cured material; amounts of filler from 5 to 30 parts are preferable. Representative examples of such fillers are carbon black, hard clay, soft clay, silica, other silicates, carbonates, etc. The wax-crystalline elastomer composition may also contain other rubbery polymers such as butadiene polymers, ethylene copolymers, styrene-butadiene or butadiene-acrylonitrile copolymers, the amounts of such other rubbery polymers being up to 50 parts by weight per 100 parts of crystalline elastomer.

The uncured composition is a leathery, tough material with a high degree of luster due to the presence of the wax. Sheets made from such compositions can be bent, twisted and cut; they are sufficiently rigid to retain creases, twists and kinks. On heating to slightly elevated temperatures, they become plastic, are easily deformable and readily moldable. The yield stress of the uncured composition at slightly elevated temperatures is low.

On curing which, depending on the vulcanization agent or the method of curing, may be carried out at room temperature over a prolonged period of time or at elevated temperatures of up to about 200°C, the composition becomes somewhat softer, more pliable and less rigid suggesting that a certain amount of crystallinity has been lost. However, it is still crystalline enough at room temperature to be resistant to moderate deformation stresses and is still somewhat tough and leathery although it may still be elongated at room temperature. When heated to a slightly elevated temperature such as to soften the vulcanizate and which minimum temperature is believed to probably be at about the initial melting point of the polymer crystals, the warmed cured composition behaves like a rubber and meets the ASTM Standards definition of rubber (ASTM-D-1566) with respect to the ability to retract within 1 minute to less than 1.5 times its original length after being stretched to twice its length and held for 1 minute before release. In contrast to the conventional rubbers, the present composition is characterized by the ability to freeze elastic stresses imposed thereon while in the rubbery state and to store them for an indefinite period of time in the frozen state, i.e. generally at ambient temperatures or below. This can best be illustrated by a specific example. A peroxide cured ⅛ inch sheet containing 100 parts by weight of a trans-1,4 polyisoprene having a Mooney viscosity (M/L 4 @ 100°C) of about 15 and about 30 percent crystallinity and 50 parts by weight of paraffin wax having a melting point of 52°C and 10 parts by weight of a fine particle size hard clay was a tough and manually difficult to extend sheet at room temperature. Warmed in tap water at a temperature of about 50°C, it became rubbery and easily extendible. It was manually stretched when warm to about 200 percent elongation and placed in the stretched condition on a plastic screw type bottle cap so as to completely cover it. The stretched sheet was then permitted to cool for less than one minute to ambient temperature whereby it again became tough. When taken off the bottle cap, the sheet showed an excellent impression of the cap and the impression was not lost even after storing at room temperature for about 16 hours. When this stretched sheet was placed under a hot water tap, the sheet quickly returned to its original shape and dimension and there was practically no residual distortion in the sheet.

This unusual property of the vulcanized composition makes it suitable for use in cast or molded goods for playing, decorating (e.g., flowers, dolls, birds, animals, etc.), which can be stored in cramped containers then brought to the desired shape by simply immersing them in hot water or by heating with warm air. The composition of this invention can also be used as sealing elements in pumps and as washers in valves and taps in cold service. The sealing effect, when lost due to set, can be re-established simply by heating the seal.

In the form of tubular extrusions, the vulcanized composition of this application can be used as an insulation for electrical conductors, especially in repair work. By heat shrinking in situ, the insulation would be largely water and vapour tight. This list of applications is by no means complete; it merely serves to illustrate the utility of the composition of this application.

The invention is further illustrated in the following examples.

EXAMPLE 1

The compounds of Table I were prepared by mixing the components on a two-roll rubber mill. The amount of polymer used in all experiments was 100 parts by weight. For experiments A to D, the polymer was a polyisoprene having a trans-1,4 content of greater than 95 percent and having a Mooney measured at 212°F of 28. The X-ray-determined crystallinity of the polymer was 28 to 30 percent. For experiment E, the polymer was an ethylene-vinyl acetate copolymer containing 32 to 34 percent vinyl acetate, known as Elvax 150 (trademark). For experiment F, the polymer was a polymer of neoprene which has a very high crystallinity, known as Neoprene HC (trademark). The wax used, parts by weight as shown in the Table, was a refined paraffin wax having a melting point of 125° to 127°F. The clay, parts by weight, was a hard clay with a specific gravity of 2.6 and an average particle size of 87 to 92 percent being less than 2 microns, and known as Suprex Clay (trademark). With the exception of experiment D, all compounds contained 2.5 parts by weight of dicumyl peroxide, Dicup 40 C (trademark), as a curative. The compound of experiment D contained as curative 1.25 parts by weight of sulphur and 0.25 parts by weight of dibenzothiazyl disulphide. All the compounds were milled to form sheets of uniform thickness, transferred to suitable molds and then cured by heating for 10 minutes at 150°C. The stress-strain and other measurements were determined on dumbbells cut out from these sheets, the stress-strain measurements being determined using standard ASTM procedures for both room temperature and 45°C determinations. The other test results were determined using the procedures identified in the notes to Table I.

TABLE I

| Experiment No. | A | B | C | D | E | F |
|---|---|---|---|---|---|---|
| Polymer | Trans-1,4-Polyisoprene | | | | Ethylene-Vinyl Acetate | Neoprene |
| Weight of Wax | 50 | 50 | 70 | 50 | 50 | 14.5 |
| Weight of Clay | 10 | 60 | 10 | 10 | 10 | 10 |

TABLE I—Continued

| Experiment No. | A | B | C | D | E<br>Ethylene-Vinyl | F |
|---|---|---|---|---|---|---|
| Polymer | Trans-1,4-Polyisoprene | | | | Acetate | Neoprene |
| Properties | | | | | | |
| 300% Modulus | | | | | | |
| Room Temperature (Kg/cm²) | 117 | 78 | 95 | 78 | 39* | 72 |
| 45°C (Kg/cm²) | 38 | 14 | 29 | 8 | 15* | 9** |
| Tensile Strength Kg/cm² | | | | | | |
| Room Temperature | 187 | 98 | 167 | 121 | 48 | 234 |
| 45°C | 93 | 24 | 50 | 14 | 15 | 47** |
| Elongation % | | | | | | |
| Room Temperature | 460 | 380 | 470 | 450 | 140 | 750 |
| 45°C | 510 | 430 | 440 | 490 | 310 | >800** |
| Retention of elongation % (See note 1) | 86 | 96 | 92 | 96 | 94 | 86 |
| Change from original length % (See note 2) | −10 | +10 | +5 | +15 | — | −5 |
| Retention of original length % (See note 3) | 100 | ND | ND | ND | ND | 100 |

*100% Modulus
**at 60°C

Notes to Table I

1. The dumbbell was elongated from an original length of 2 cm. to a length of 5 cm., the elongation being at room temperature and the dumbbell being held at this elongation for 1 minute. The dumbbell was then released and some hours later the length of the elongated section was measured. The retention of elongation is the percentage of the elongation retained by the dumbbell; for example, if the marked section of the dumbbell still measured 5 cm. then the retention of elongation would be 100 percent.

2. The extended dumbbells from the determination of retention of elongation were immersed in water for 1 minute, the water temperature being 55°C. The dumbbells were removed and allowed to cool to room temperature and the originally marked 2 cm. length was remeasured. The change from original length is the difference between the originally measured 2 cm. length and the remeasured length after warming in the water. For example, if that portion of the dumbbell now measured 1.9 cm., the change from original length would be −5 percent.

3. A dumbbell with a 2 cm. length marked on it was elongated to 5 cm. while being immersed in water at 55°C for a period of one minute. The dumbbell was removed from the water and allowed to cool while elongated for 2 minutes to room temperature and the amount of extension retained was then measured and found to be 100 percent for all experiments. The dumbbell was then replaced in the water at 55°C for 30 seconds, removed and allowed to cool to room temperature and the length was remeasured. For example, if the length was 2 cm., the retention of original length was 100 percent.

The results of Table I show that the compositions of this invention possess elastomeric properties both at room temperature and at 45°C, as evidenced by the stress-strain results. The results also show that the shaped articles of these vulcanized compositions can be readily distorted, for instance by elongation, especially at slightly elevated temperatures, to new dimensions and will essentially retain these new dimensions when cooled. The distorted article can be restored to essentially its original dimensions by heating to a slightly elevated temperature. In the distorted condition, the article is storing the elastic stresses and strains imposed on it which stresses and strains are relieved when it is warmed and returns to its original shape. In addition to the results in Table I, a sample of the compound of experiment A which had not been vulcanized was similarly elongated and it was found, that on heating to cause the sample to regain its original shape, the sample was badly distorted in shape and did not return to its original dimensions, being 40 percent longer than the original sample. This shows that, in order to have the properties of shape distortion and subsequent restoration, the compositions have to be vulcanized. Comparing the results for experiment D with experiments A, B and C shows that the chemical nature of the vulcanization is not important, experiment D being a sulphur-vulcanized material whereas experiments A, B and C were vulcanized with peroxide.

EXAMPLE 2

Following the procedure of Example 1, a compound was prepared according to the formulation:

| Trans-1,4-polyisoprene | 100 | parts by weight |
| Paraffin wax | 50 | do. |
| Dicumyl peroxide | 2.5 | do. |

This compound was vulcanized by heating for 15 minutes at 150°C. A dumbbell cut from the vulcanized sheet was marked for a length of 2 cm., immersed in water at 53°C for 1 minute and then stretched until the marked section had reached a length of 5.0 cm. when the sample was removed from the water and allowed to cool. After cooling, the measured length was rechecked and found to be still 5.0 cm. The sample was then immersed again in water at 53°C when it retracted. Measurement showed that the marked section was 2.0 cm., i.e. the original length.

EXAMPLE 3

A compound of the same formulation as experiment A of Example 1 was prepared and put into a mold with the shape of a chicken in thin sheet form. On curing, the vulcanizate retained the shape of the mold. The vulcanizate was warmed to about 50°C, stretched to form a long tape, wound around an egg-shaped object and allowed to cool into the shape of an egg. The egg-shaped object was removed by unwinding some of the windings forming the egg shape which windings returned to the egg shape on release. Starting from the sheet form chicken a hollow egg has now been formed. On heating to about 50° – 55°C, either in air or in water, the egg shape returned to the sheet form chicken. This cycle of changing the shape of the chicken could be repeated at least five times without serious deformation of the shape of the originally molded chicken. If the chicken had been formed from a thicker sheet, say about ¼ inch thick, an essentially solid egg could be formed from it by compression while heated.

EXAMPLE 4

Using the same formulation as for experiment A of Example 1, a sheet was prepared, shaped into a cylindrical tube with a narrow gap along its longitudinal length and vulcanized in that shape. This could be used as a shrink seal by heating the tube to soften it, putting the softened tube over the item to be sealed and then rewarming when the tube returned as much as possible to its original tubular dimensions. Similarly, a vulcanized complete cylindrical tube can be softened and inflated, by gas pressure, to expand its dimensions thereby allowing it to be put over an item for sealing. On reheating the tube will return as much as possible to its original tubular dimensions.

EXAMPLE 5

Using the same formulation as for experiment A of Example 1, sheets of various thickness were prepared and vulcanized. By means of compression molding and of vacuum forming at temperatures of about 50° – 70°C, these sheets could be molded into various shapes, for example a clown's face, and be remolded into other shapes. The time necessary for the molding operation depends on the thickness of the sheet, for instance a sheet 1/16 inch thick softens within half a minute at 45°C whereas a sheet ¼ inch thick softens within about 2 minutes when heated at 60°C.

EXAMPLE 6

The formulations shown in Table II were prepared in the same manner as those of Example 1. All components are given in parts by weight. The carbon black was an FEF black and the SBR was KRYLENE 1500 (KRYLENE is a registered trademark of Polysar Limited).

TABLE II

| Experiment No. | 1 | 2 | 3 | 4 | 5 | 6 | 7 |
|---|---|---|---|---|---|---|---|
| Transpolyisoprene | 100 | 100 | 100 | 100 | 100 | 100 | 100 |
| Paraffin wax | 50 | 5 | 20 | — | — | 50 | 50 |
| Palm wax | — | — | — | 50 | — | — | — |
| Purified beeswax | — | — | — | — | 50 | — | — |
| Suprex Clay | 90 | 10 | 10 | 10 | 10 | — | 10 |
| Carbon black | — | — | — | — | — | 10 | — |
| SBR | — | — | — | — | — | — | 50 |
| Dicumyl peroxide | 2.5 | 2.5 | 2.5 | 2.5 | 2.5 | 2.5 | 2.5 |
| Cure for 15 minutes at 150°C | | | | | | | |
| Vulcanizate Evaluation | | | | | | | |
| Tensile strength Kg/cm$^2$ | 60 | 290 | 240 | 173 | 124 | 96 | 101 |
| 300% Modulus Kg/cm$^2$ | 60 | 138 | 128 | 104 | 80 | 44* | 42 |
| Elongation % | 300 | 500 | 470 | 440 | 420 | 280 | 525 |

*100% Modulus

All of the vulcanized sheets exhibited good molding characteristics when shaped at 50°C over a form and retained this shape when cooled. On warming the shaped articles again to 50°C, they all returned to essentially their original sheet dimensions.

What is claimed is:

1. A process of producing a vulcanized thermoelastic composition capable of storing elastic stress which process is preparing a mixture comprising
   a. 100 parts by weight of a vulcanizable crystalline elastomer which is selected from a trans-1,4 polymer of a conjugated diolefin compound selected from butadiene-1,3, isoprene and chloroprene and from crystalline copolymers of ethylene with vinyl acetate, said crystalline elastomer having a crystalline melting point of from about 50°C to about 150°C and on X-ray crystallinity of from 5 percent to about 40 percent,
   b. from 5 to 100 parts by weight of a crystalline wax having a melting point of from about 40°C to about 100°C and,
   c. vulcanizing agent, and vulcanizing the mixture to produce said thermoelastic composition.

2. The process according to claim 1 wherein the crystalline elastomer is a trans-1,4 polymer of isoprene having a trans-1,4 content of at least about 85 percent and wherein the vulcanizing agent is a free radical vulcanization system selected from the sulphur and organic peroxide systems.

3. The process of claim 2 wherein the crystalline wax is present in an amount of from about 10 to about 60 parts by weight.

4. The process of claim 1 wherein said mixture additionally contains up to 100 parts by weight of filler selected from carbon black, silica, hard clay, soft clay and carbonates.

5. The process according to claim 4 in which said mixture also contains up to 50 parts by weight of rubbery polymer selected from butadiene polymers, ethylene copolymers, styrene-butadiene copolymers and butadiene-acrylonitrile copolymers.

6. A vulcanized thermoelastic composition capable of storing elastic stresses which composition is produced by the vulcanization of a mixture comprising:
   a. 100 parts by weight of trans-1,4 polyisoprene having a trans-1,4 content of at least about 85 percent and an X-ray crystallinity of from 5 percent to about 40 percent having a crystalline melting point of about 70°C to about 80°C.
   b. from 10 to 60 parts by weight of a crystalline wax having a melting point of from 50 to 65°C.
   c. a free radical vulcanization system selected from the sulphur and organic peroxide systems, and
   d. from 5 to 30 parts by weight of a hard clay filler.

7. The composition of claim 6 which additionally contains up to 50 parts by weight of rubbery polymer selected from butadiene polymers, ethylene copolymers, styrene-butadiene copolymers and butadiene-acrylonitrile copolymers.

8. The composition of claim 6 in the form of a shaped plaything which may, after distortion, be restored to its original shape by the process of warming to a slightly elevated temperature.

9. The composition of claim 6 in the form of stretchable and heat shrinkable tubes, tapes and films.

* * * * *